Nov. 10, 1953 H. J. HARSANT ET AL 2,658,952

MAGNETIC RECORDING AND REPRODUCING DEVICE

Filed May 10, 1949 3 Sheets-Sheet 1

*INVENTOR.*
THEODORE F. DEUCHER
HENRY J. HARSANT
*BY*
Eber J. Hyde
ATTORNEY

INVENTOR.
THEODORE F. DEUCHER
HENRY J. HARSANT
BY
Eber J. Hyde
ATTORNEY

MAGNETIC RECORDING AND REPRODUCING DEVICE

Filed May 10, 1949 3 Sheets-Sheet 3

INVENTOR.
THEODORE F. DEUCHER
HENRY J. HARSANT
BY
Elver J. Hyde
ATTORNEY

Patented Nov. 10, 1953 2,658,952

UNITED STATES PATENT OFFICE 2,658,952

MAGNETIC RECORDING AND REPRODUCING DEVICE

Henry James Harsant, Lakewood, and Theodore Frank Deucher, Parma, Ohio, assignors, by mesne assignments, to Clevite Corporation, Cleveland, Ohio, a corporation of Ohio Application May 10, 1949, Serial No. 92,378

9 Claims. (Cl. 179—100.2)

This invention pertains to a magnetic recording and reproducing device, and more particularly to such a device particularly adapted for use by radio broadcasting studios and by other organizations or persons desirous of having a high-quality transcription machine which provides the maximum ease and accuracy of control of the record medium.

It is an object of the invention to provide a high-quality magnetic recording and reproducing device particularly adapted for transcription use which easily and quickly responds to numerous control actions of the operator.

A further object of the invention is to provide a high-quality magnetic recording and reproducing device which responds to a large number of control functions and yet which is reliable in its operation.

Another object of the invention is to provide a high-quality magnetic recording and reproducing device including a long length of record material on which program material is recorded which permits the rapid and accurate location of any given portion of the recorded program.

Still another object of the invention is to provide a high-quality magnetic recording and reproducing device which permits a positive and quick control of forward and reverse motion of the record material.

Another object of the invention is to provide a high-quality magnetic recording and reproducing device which may be controlled at its regular control panel or which may be controlled at a remote location.

A further object of the invention is to provide a high-quality magnetic recording and reproducing device whose record material is automatically stopped for all emergencies except during normal-speed forward motion past the transducer heads.

It is also an object of the invention to provide a high-quality magnetic recording and reproducing device having an amplifier which is automatically muted to prevent undesirable noises from being recorded and/or reproduced.

For a better understanding of the present invention, together with other and further objects thereof, reference is had to the following description taken in connection with the accompanying drawings, and its scope will be pointed out in the appended claims.

In one aspect of the invention the magnetic recording and reproducing device comprises a supply reel with a takeup reel spaced away from it. A length of magnetic record material extends between the two reels and transducer head means are located along the path of motion of the record material between the supply and takeup reels. A first controllable passive torque transmitting element such as a magnetic clutch is connected between motor drive means and the supply reel and a similar device is connected between the motor drive means and the takeup reel for selectively connecting the reels to the motor, and first and second control means which may be actuated by an operator control the amount of torque transmitted by the first and second torque transmitting elements to the supply and takeup reels.

Figure 1:
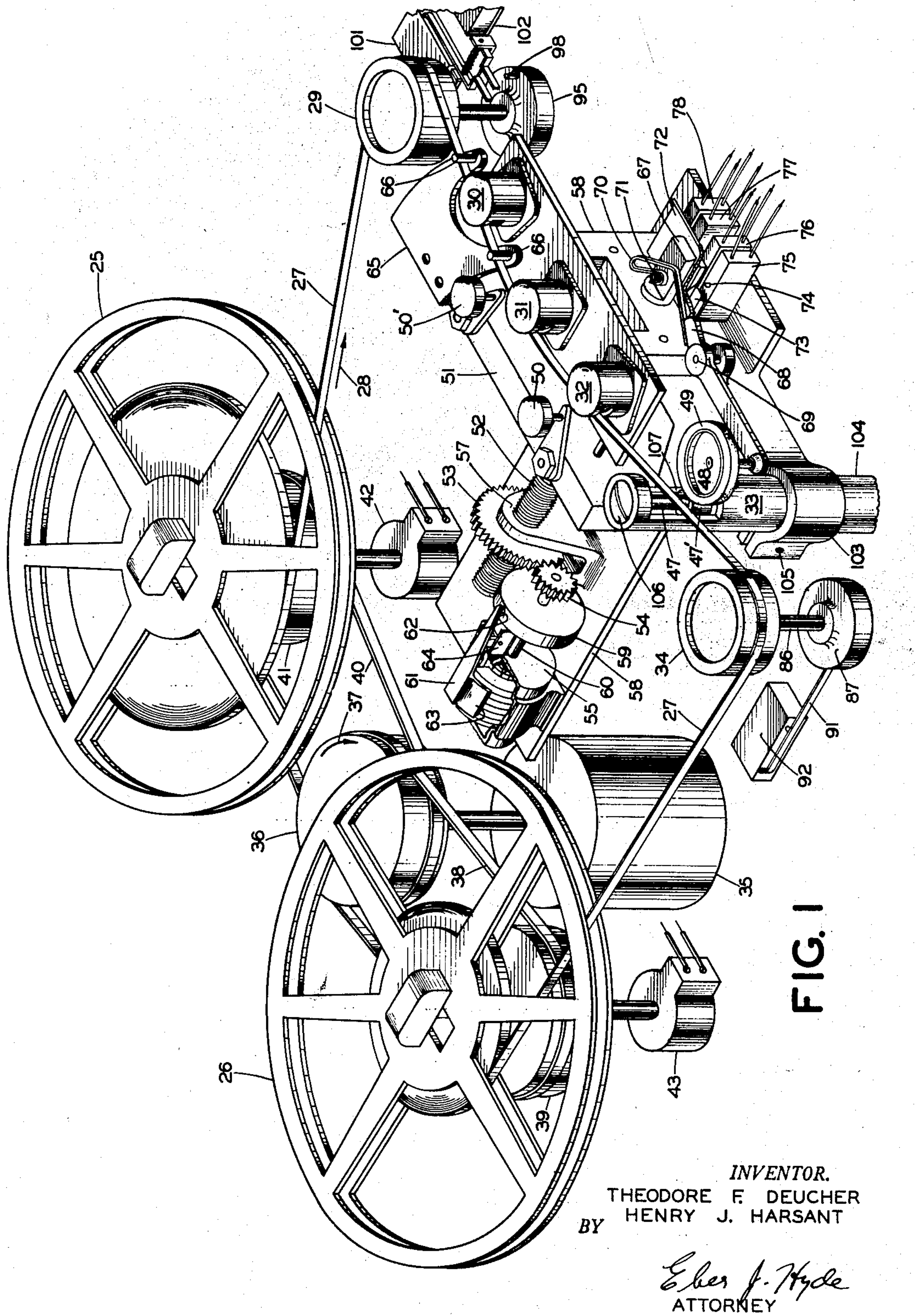
Fig. 1 is an isometric view of the mechanical portion of the recorder-reproducer.
Figure 2:
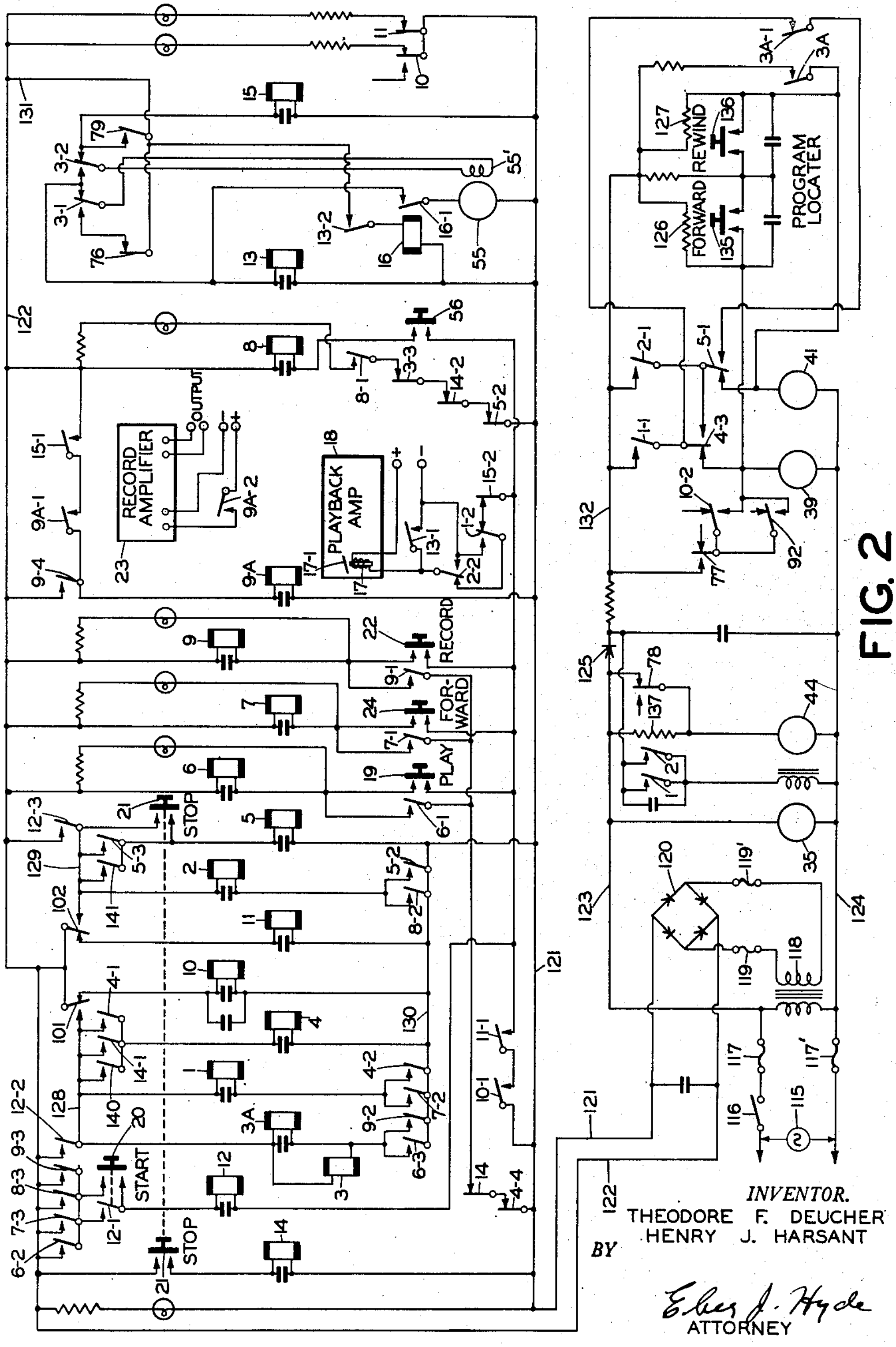
Fig. 2 is a circuit diagram.
Figures 3, 4, 5:
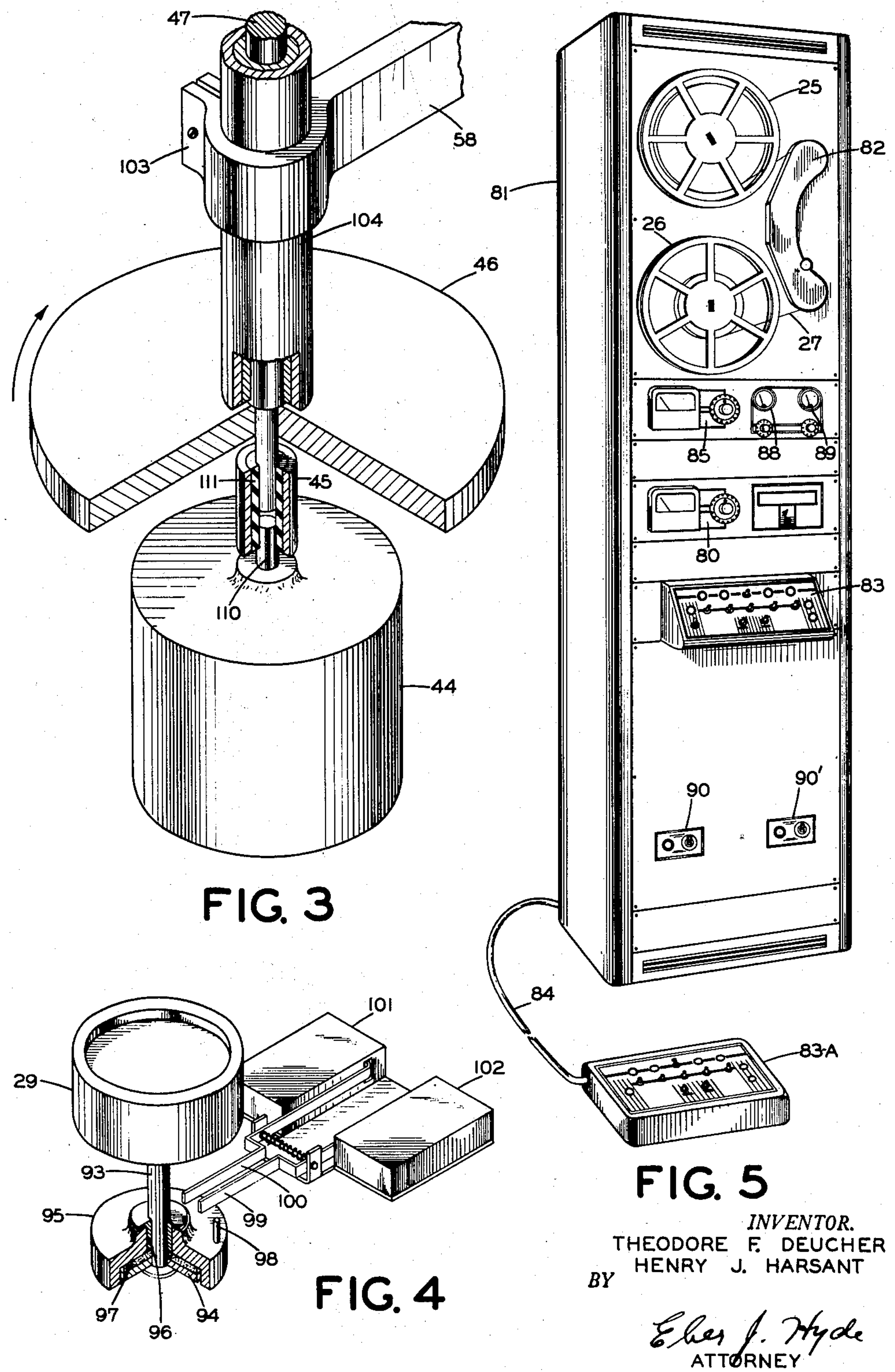
Figs. 3 and 4 show details of portions not shown completely in Fig. 1.
Fig. 5 is an isometric view of the cabinet for the device.

Fig. 1 shows the details of the mechanical portion of the device, and Fig. 2 is a diagram of the electrical circuit. The mechanical portion and its associated electrical equipment are mounted in a cabinet 81 (Fig. 5). Reels 25, 26 are mounted on the front of the cabinet and the record material 27 extends from one of them to the other under the cover 82 which encloses the transducing heads and a drive mechanism which is in engagement with the record material.

A control panel 83 is provided. It has an on-off switch and push buttons for controlling the direction and rate of motion of the record material. An auxiliary control panel 83A is provided. It is similar to the panel 83 with the exception that it does not include an on-off switch. The auxiliary control panel is connected to the cabinet 81 by means of the cable 84 which may be of sufficient length to enable an operator of the device to be in another room from the device. Control of the device may be exercised from either of the control panels 83 or 83A.

A recording level meter and control 85 and a playback level meter and control 80 are mounted on the front face of the cabinet 81. There is also provided a bias level indicator and control 88 and an erase level indicator and control 89. Switches 90, 90' at the bottom of the cabinet control the power supply to the tube filaments and plates.

The mechanical portion of the magnetic recording and reproducing device (Fig. 1) comprises the two reels 25 and 26 mounted in spaced-apart relationship, with the length of magnetic material such as wire or tape 27 extending from one reel to the other. As illustrated, reel 25 is the supply reel and reel 26 is the takeup reel as the record material 27 moves in a direction shown by the arrow 28 during the recording and reproducing of a program. The record material in its path between the supply and takeup reels passes around a first or upper idler roller 29, then past a series of transducer heads such as the obliterating head 30, the recording head 31, and the reproducing head 32. The record material on its way to the takeup reel 26 then passes a driven capstan, indicated generally by the reference character 33, and a second or lower idler roller 34.

Drive means are provided for driving the supply and takeup reels. The drive means comprise a clutch drive motor 35 connected to a flywheel 36 which rotates only in the direction of the arrow 37. A belt 38 connects the flywheel 36 to a first controllable passive torque transmitting element such as the magnetic clutch 39, and a belt 40 connects the flywheel 36 to a second controllable passive torque transmitting element such as the magnetic clutch 41. The belts 38 and 40 are so connected to the magnetic clutches 39 and 41 and the record material is so wound about the reels 25 and 26 that both reels at all times during the operation of the device tend to wind up the record material 27. A slip ring 42 is provided for connecting the electromagnetic clutch 41 of the supply reel 25 to an electric circuit so that the degree of coupling of the reel 25 to the drive motor 35 may be selectively varied in accordance with the direction and rate of motion of the record material and so that in an emergency the reel may be quickly brought to a stop. The takeup reel 26 is similarly coupled to the drive motor 35 through the magnetic clutch 39 and the slip ring 43. Just how the clutches are controlled electrically by control means which may be actuated by an operator is more fully described in connection with the details of the electric circuit.

A second motor called the capstan drive motor 44 (Fig. 3) is connected through a coupling collar 45 to a flywheel 46 and to a capstan drive member or spindle 47. The capstan drive member is adapted to be coupled to the record material at a location between the transducer heads 30, 31, 32 and the takeup reel 26. A wheel 48 having a rubber tire 49 couples the record material 27 to the capstan drive member 47 by pressing the record material tightly against the capstan, and when so coupled the capstan drive member 47, 47' pulls the record material past the transducer heads. The takeup reel 26 is sufficiently strongly coupled to the motor 35 by means of the electromagnetic clutch 39 that the takeup reel 26 winds up all of the record material which the capstan drive member 47 pulls past the transducer heads. It is preferable that the reel 26 try to take up record material at a rate slightly greater than the rate at which the capstan pulls it past the transducer heads. The supply reel 25 is very weakly coupled to the motor 35 so that the record material is pulled from it by the capstan 47 in spite of its tendency to wind up the record material.

A pair of tape positioning rollers 50, 50' are provided for positioning the tape closely against the transducer heads only during normal-speed recording and reproducing operations. The rollers 50, 50' are mounted on a movable positioning mechanism which retracts them from the record material during high-speed forward and reverse operations to reduce the wear on the heads and the tape. The rollers 50, 50' are mounted on a plate 51 which can be advanced or retracted by the screw 52, the gear train 53, 54 and a motor 55. A second plate 65 is connected to the plate 51 and carries two retracting pins 66 positioned between the tape 27 and the obliterating head 30, preferably with one pin 66 on each side of the head. The detailed description of the electric circuit describes how and when the motor 55 is energized to advance and retract the positioning rollers 50, 50' and the retracting pins 66 to urge the tape into close magnetic coupling engagement with the transducer heads only during recording-reproducing operations and to retract the tape from the obliterating head 30 during reverse and high-speed operations. When the plates 51, 65 are in their advanced position, the positioning rollers 50, 50' are located between the heads 32, 31 and 31, 30, respectively, thereby holding the tape in close operative contact with the magnetic gap in each of the heads. In this advanced position the retracting pins 66 are out of engagement with the tape. When the plates 51, 65 are in their retracted position, as shown in Fig. 1, the positioning rollers 50, 50' are away from the tape 27 and the positioning pins 66 engage the recording face of the tape and hold it away from the obliterating head 30 and away from the recording head 31. However, the tape 27 operatively engages the reproducing head 32 so that an operator can reproduce and hear the recorded program. This feature is valuable as it enables the operator to run the tape forward and backward at high speed while listening for a certain portion of the recorded program. When the operator hears the certain portion go by, he reverses the direction of the tape and reduces its speed. A more exact location of the desired portion is then made.

The plate 51 to which the rollers are connected is secured to the lead screw 52 which extends through the bifurcated mounting bracket 57 mounted on the support 58. The large gear 53 is mounted between the arms of the bifurcated bracket 57, and it has a threaded hole (not shown) through which the lead screw 52 extends. The spur gear 54 meshes with the large gear 53. The spur gear 54 and a brake wheel 59 are mounted on the shaft 60 of the motor 55 which is secured to the support 58. A brake mechanism is mounted on the housing of the motor 55. It comprises a pivotally mounted arm 61 having a friction pad 62 underneath one of its ends in position to engage the rim of the brake wheel 59 and it has a soft iron portion 63 at its other end positioned in the field region of the motor 55. A spring (not shown) is connected to the mounting bracket 64 for the arm 61 and engages the arm 61 to bias the friction pad 62 strongly into engagement with the brake wheel 59. When the motor 55 is energized to advance or retract the positioning rollers 50, 50' the external electromagnetic field of the motor attracts and holds the soft iron portion 63 down onto the housing of the motor thereby releasing the friction pad 62 from engagement with the brake wheel 59. Instantly upon the motor 55 being de-energized the friction pad 62 is spring biased into braking engagement with the brake wheel 59 to prevent the motor 55 and its gear train from coasting.

The record material coupling wheel 48 couples the record material to the spindle 47 of the capstan drive member 33 in the following manner: A finger 67 extends through a hole in the mounting bracket 58 and is secured to the lead screw 52. As the lead screw 52 advances, the finger 67 is thrust out from the bracket 58. An arm 68 is pivotally mounted at 69 on the bracket 58 and one of its ends is connected to a strong spring 70. The coupling wheel 48 is rotatably mounted on the other end of the arm 68. The spring 70 engages a pin 71 extending up from the finger 67. As the finger 67 is driven forward the arm 66 pivots about point 69 until the rubber tire 49 of the coupling wheel 48 engages the tape 27 at the location of the spindle 47 of the capstan 33. The finger 67 continues to be driven forward and the spring 70 bends as the arm 68 cannot pivot any further due to the wheel 48 being hard against the tape 27 which is backed by the capstan spindle 47. This establishes a strong spring bias continuously urging the coupling wheel 48 against the capstan spindle 47 with the tape 27 pinched in between.

A switch actuating plate 72 is secured to the bottom of the finger 67 and advances and retracts with it. Underneath the switch actuating plate 72 and carried by it are four inclined switch actuating blocks 73 (only two shown) which engage and depress the pins 74 (only one shown) of the micro-switches 75, 76, 77, 78 as the plate 72 advances. The inclined faces of the four switch actuating blocks 73 are so positioned with respect to the switch pins 74 that the switches are actuated at different times, thereby introducing time delay in a series of switching operations, more fully described in connection with the electrical circuit.

A lower tape break switch 92 is located between the capstan 33 and the takeup reel 26 and comprises the idler roller 34 about which the record material 27 runs thereby causing the capstan 34 to rotate. A shaft 86 is connected to the capstan and a cup-shaped member 87 is secured to the shaft and they both rotate with the capstan. Within the cup-shaped member with one face bearing against the bottom surface thereof is a friction pad, and a plate is connected around the shaft 86 and bears against the other face of the friction pad. A pin is connected to the plate and extends outwardly beyond the lip of the cup-shaped member where it loosely engages the switch actuating arm 91 of the switch 92. When the recorder-reproducer is either recording a program or is reproducing a previously recorded program, the magnetic record member travels from the supply reel 25 to the takeup reel 26 and causes the idler roller 34 to rotate in a clockwise direction. This rotates the cup-shaped member 87 in a clockwise direction and through the friction pad therein applies a bias which closes the switch 92. The switch 92 is held closed so long as the idler roller is being turned by the record material but immediately upon the idler roller 34 ceasing to turn, either due to a breakage of the record material or to a deliberate stopping of the machine, the frictional bias is removed from the switch 92 and it opens up.

An upper tape break switch 101, 102 is located between the supply reel 25 and the capstan 33. It comprises the idler roller 29 which is driven in a clockwise direction by the record material during the recording and playback operations. The idler roller 29 is mounted on one end of a shaft 93 (Fig. 4) and a drive plate 94 is tightly connected to the other end of the shaft. A cup-shaped member 95 is mounted around the shaft 93 by means of the bearing 96 and the shaft is adapted to rotate with respect to the cup-shaped member. A friction pad 97 is positioned between and in engagement with a face of the drive plate 94 and the inside bottom surface of the cup-shaped member 95 so that as the drive plate is rotated by the idler roller a frictional force is applied to the cup-shaped member 95 causing it to rotate in the same direction as the idler roller. A pin 98 is connected to the cup-shaped member and upon rotation of the cup-shaped member engages one or the other of two switch arms 99 and 100, depending on the direction of rotation. In the forward or recording and reproducing direction the pin 98 engages switch arm 100 and closes switch 101. The frictional bias applied to switch 101 through switch arm 100, pin 98 and cup-shaped member 95 keeps the switch closed so long as the idler roller is rotating in a clockwise direction. When the idler roller stops due to any cause the frictional bias is removed and the contacts of switch 101 open. Rotation of the idler roller 29 in a counter-clockwise direction causes the pin 98 to engage switch arm 99 to close switch 102 and establish an electrical holding operation which is described in detail in connection with the electric circuit.

The capstan assembly, which is indicated generally by the reference character 33, is connected to the mounting bracket 58 by means of the split ring 103 which is integral with or connected to the mounting bracket 58. A hollow shaft 104 is mounted within the split ring 103 and the ring is clamped to the shaft 104 by tightening the screw 105. The upper end of the hollow shaft 104 is closed by means of a large screw 106, and a bearing (not shown) is provided between the upper end of the rotatable spindle 47 and the shaft 104. Near the upper end of the hollow shaft 104 there is a window 107 which exposes both a small diameter 47 and a large diameter 47′ portion of the rotatable spindle so that it may be coupled to the record member 27 by means of the coupling wheel 48.

The spindle 47 (Fig. 3) of the capstan assembly 33 is connected to the motor 44 by means of the sleeve 45 which is in driving engagement with the shaft 110 of the motor. Within the sleeve 45 there is a rubber collar 111 and this rubber collar is in tight frictional driving engagement with both the end of the motor shaft 110 and the lower end of the spindle 47. Both the motor shaft and the spindle may be knurled or keyed at the location of the rubber collar to provide good frictional gripping. The spindle which drives the tape 27 has two portions 47, 47′ of different diameters exposed at the window 107. Either of these two portions may be coupled to the tape 27 so that the tape may be driven at two different speeds. When the smaller diameter portion 47 of the spindle engages the tape, the tape is driven at a slower speed than when the large diameter portion 47′ is in engagement with the tape 27. To position one or the other of the spindle portions 47, 47′ next to the tape 27 the entire spindle assembly is moved. The collar 45 and the rubber coupler 111 should be sufficiently long that the capstan assembly 33 may be slid longitudinally with respect to the split ring 103 to position the large diameter portion 47′ of the spindle opposite the location of the coupling wheel 48. This provides two-speed drive of the record material. In order to change the drive speed, the screw 105 is loosened and the entire assembly comprising the hollow shaft 104, the spindle 47 within the shaft and the flywheel 46 is moved until the other diameter portion of the spindle is opposite the coupling wheel 48. The screw 105 is then tightened. Longitudinal slippage of the spindle 47 with respect to the motor shaft is permitted by the rubber collar 111 within the sleeve 45.

The electrical circuit of the relay system which operates the recorder device is connected to a source 115 of 110 volt alternating current. Through an on-off switch 116 and fuses 117, 117′ the current source 115 energizes the primary of the power transformer 118. The secondary of the transformer is fused by fuses 119, 119′. The output of the transformer 118 is rectified by a dry disk rectifier system 120 to furnish 14 volts direct current across the line 121, 122. The 110 volt A. C. circuit is connected across lines 123, 124 and energizes the drive motor 35 for the clutches 39, 41 and reels 25, 26 and also energizes the drive motor 44 for the capstan 33. Through the rectifier 125 in the A. C. line 123 and the resistors 126, 127, D. C. power is supplied to energize the takeup and supply reel clutches 39 and 41.

Closing the on-off switch 116 also immediately applies a slight D. C. potential through slip rings 43 and 42 to the magnetic clutches 39, 41 thereby tending to cause the reels 26, 25 connected to the clutches to take up tape. This applies a slight tension to the portion of the tape 27 extending between the two reels.

Closing the on-off switch 116 also energizes the D. C. line 121, 122 and through the upper tape break switch 101, 102 energizes the relays 10 and 11. This causes relay contacts 10—1 and 11—1 to close. Closing the contacts 10—1 and 11—1 immediately energizes relay 17 which closes a contact in the playback amplifier 18 thereby muting the amplifier. The muting is released when the tape starts to move opening the upper tape break switch 101, 102 which de-energizes relay 10 causing switch 10—1 to open and break the circuit through muting relay 17.

SEQUENCE OF OPERATION

*Playback operation*

The operator selects the desired operation, such as "playback," by pushing the "Play" button 19. This energizes relay coil 6. Relay 6 holds itself in through its own contact 6—1 and also closes contact 6—2 and contact 6—3 in the circuit of relays 3 and 3A. Then the operator presses the start button 20. This energizes start relay 12 from the line 122 through closed contact 6—2 and through the closed contact 12—1 which was closed when the start button 20 was pushed, and back through closed contacts 10—1 and 11—1 to negative line 121. Relay 12 holds itself in through contact 12—1 after the start button is released. Relay 12 closes contact 12—2 to energize line 128 and closes contact 12—3 to energize line 129. As soon as line 128 becomes energized, relays 3 and 3A are energized through closed contact 6—3 back to the negative line 130. Relay 3, when energized, makes a circuit for relay 13 from line 122 through line 131, closed contact 76, closed contact 3—1, the field coil 55′ of the motor 55 and closed contact 3—2. Relay 13 closes the switch 13—1 which energized a muting relay 17 in the playback amplifier 18 and maintains the muted condition until motor 55 positions the capstan coupling wheel 48 and the rollers 50, 50′, at which time the switch 13—1 opens.

Relay 13 also closes contact 13—2 to energize relay 16. Relay 16 closes the contact 16—1 to establish a circuit through the armature of motor 55 to cause the capstan idler 48 to engage the tape and push it against the drive capstan 47 and also to position the rollers 50, 50′. A closed contact 76 mounted on the pressure pad assembly opens as the motor 55 advances the plate 72, causing the motor 55 to stop when the finger 67 reaches the end of its stroke. Operation of motor 55 causes contact 77 to close and this through closed relay contacts 10—2 energizes the takeup clutch 39. As the tape starts to move, the lower tape-break switch 92 is closed, shunting relay contacts 10—2 which open as the tape is underway. The purpose of this circuit through contact 92 is to permit the machine to continue operating if the tape breaks between the takeup reel and the capstan but it also de-energizes the takeup reel clutch 39 in case of a break so that the tape on the takeup reel will not be thrown around. As the tape starts moving, the line 128 is held in the circuit by the upper tape break switch contact 101 which keeps relay 3 energized even though the start relay 12 falls out when relay 10 becomes de-energized and contact 10—1 opens.

To stop the above sequence, the operator presses the "Stop" button 21 which energizes relay 14 and closes contact 14—1 thereby energizing relay 4. Relay 4 is held by contact 4—1 and through closing contact 4—2 it energizes relay 1. Relays 1 and 4 make a circuit through contacts 1—1 and 4—3 from the positive D. C. line 132 through the back contact of relay 5—1 and energize the supply reel clutch 41 which tends to bring the tape to a stop. Relay 4 simultaneously de-energizes relay 6 by opening contact 4—4 and relay 6 de-energizes relays 3 and 3A by opening contact 6—3. De-energizing relay 3 starts the capstan idler motor 55 to operate by returning contacts 3—1 and 3—2 and brings the capstan idler wheel 48 away from the capstan 33 and also removes the pressure rollers 50, 50′ from between the transducer heads 32, 31 and 31, 30 respectively. Running the motor 55 to put the finger 67 in its retracted position throws contact 77 to its original position which de-energizes the takeup reel clutch 39 and contact 76 closes to prepare the capstan idler motor field circuit for the next recording or playback operation.

It is desirable to mute the playback amplifier 18 during fast forward and fast reverse motion of the record material to prevent the program recorded on the record material from being heard in a distorted manner. The amplifier is also in a muted condition while the record material is standing still to prevent push-button or switching noises from being heard as an operator puts the machine in condition to operate. The amplifier is not muted during normal speed forward and reverse motion of the record material under control of the program locator push-buttons 135, 136 as it is essential that the operator hear the program being reproduced in order for him to exactly locate the desired portion of the recorded program.

The muting circuit for the push-pull playback amplifier 18 comprises a relay 17 for shorting the grids of the last stage of the amplifier by means of switch blade 17—1. One side of the relay is connected to positive and the other side is connected to negative through switch 13—1 of relay 13 and through switches 1—2, 2—2, and 15—2 of relays 1, 2, and 15, respectively. When the on-off switch 116 is closed and the start button 20 is pushed relay blades 10—1 and 11—1 are thrown, as has been described. When the magnetic record material is at rest, switches 1—2, 2—2, and 15—2 are on their back contacts and connect the relay 17 through closed contacts 10—1 and 11—1 to the negative side of an electric circuit thereby energizing the relay 17 and actuating the switch blade 17—1 which immediately shorts the playback amplifier.

The capstan idler motor 55 is energized to cause the coupling roller 48 to engage the capstan spindle 47 and to cause the rollers 50, 50' to press the tape 27 against the transducer heads. As the switch actuating plate 72 moves forward simultaneously with the actuation of the coupling roller 48, it actuates the switches 79 and 76. Switch 79 energizes relay 15 which opens switch blade 15—2 in the muting circuit. Substantially simultaneously the record material 27 has started to move due to the coupling roller 48 squeezing it against the rotating spindle 47. As soon as the record material begins to move in a forward or reverse direction the one or the other of the tape break switches 92 or 101 will be thrown de-energizing either relay 10 or 11 thereby opening up switch 10—1 or 11—1. This opens up the circuit through relay 17 and the muting is removed.

*Record operation*

The sequence of the operation of the relays in the record cycle is somewhat similar to that in the playback cycle, the difference being that the record amplifier plate voltage is energized during recording but not in playback.

When the record button 22 is pressed, relay 9 becomes energized, which closes contacts 9—2 paralleling contacts 6—3 thereby energizing relay 3. Contacts 9—4 of relay 9 close energizing relay 9A, and relay 9A holds itself in through its own contacts 9A—1 and 15—1 which closes when the motor 55 starts to run and closes contact 79. Relay 9A also closes its contacts 9A—2 to energize the plate voltage of the record amplifier 23. All other operations are the same as in the play sequence. When the unit is stopped from the record operation, contacts 15—1 of relay 15 continue to hold in relay 9A. This keeps plate voltage on the record amplifier 23 until the tape has been removed from the record and erase heads so that noises will not be recorded on the tape due to transients set up by braking of the positive circuit to the record amplifier. Relay 9A is de-energized when the motor 55 retracts the idler 48 and opens the switch 79, thereby opening switch contacts 15—1.

During the stop part of the record cycle, it is necessary to remove the tape from the record and erase head before de-energizing the plate voltage of the record amplifier. This is accomplished by holding relay 9A which is energized through contact 9—4 to close contact 9A—1 and contact 15—1 is held closed until the motor 55 has retracted, opening the contact 79.

Fast forward operation is controlled through pushbutton 24 called "Fast Forward." Closing the button 24 energizes relay 7 which holds itself in by closing contact 7—1. Relay 7 also closes contact 7—2 making a circuit from line 128 through the relay 1 to negative line 130, and also closes contact 7—3 so that pressing the start button 20 energizes the line 128 through contact 12—2 of relay 12. This energizes relay 1 which closes its contact 1—1 to make a circuit from the D. C. 110 volt positive control line 132 through the takeup reel clutch 39. To stop the fast forward operation, the stop button 21 is pressed, which energizes relay 14 closing contact 14—1 to energize relay 4. This closes contact 4—3 and switches the feed of D. C. from the takeup reel clutch to the supply reel clutch 41 and brings the tape to a stop. As soon as the tape comes to a stop, the upper tape break switch 101 opens, de-energizing relay 4 and which in turn de-energizes the supply reel clutch 41.

The rewind operation is controlled by the rewind pushbutton 56 which energizes relay 8. Relay 8 holds itself in through its own contact 8—1 and also contacts 3—3, 14—2, and 5—2 of relays 3, 14, and 5, respectively. The holding circuit for relay 8 includes contact 3—3 of playback relay 3. The reason for holding relay 8 through relay 3 is that the operator might inadvertently select both forward and reverse. If he then pushed the start button the record medium would try to go both forward and reverse at the same time. With contact 3—3 in the circuit of rewind relay 8 both operations cannot be simultaneously selected because energizing playback relay 3 opens contact 3—3 in the holding circuit thereby de-energizing relay 8. Relay 8 closes contact 8—2 to establish a circuit through relay 2 to negative line 130 and also closes contact 8—3. Pressing the start button 20 energizes relay 12 which energizes relay 2. Relay 2 closes contacts 2—1 to energize the supply reel clutch 41 which drives the tape in the rewind direction. As soon as the tape is in motion, relay 2 is held in by the upper tape break switch 102. The rewind operation is stopped by pressing the stop button 21 which energizes relay 14 and also relay 5. Relay 5 holds itself in by closing contact 5—3 and it reverses the feed from the supply reel clutch to the takeup reel clutch by closing contact 5—1 causing the tape to come to a stop. As soon as the tape is stopped, the upper tape break switch 102 will open de-energizing relays 5 and 2 and leaving the system de-energized.

In the fast forward or fast reverse directions either relay 1 or 2 is energized thereby throwing either switch 1—2 or 2—2 to bypass the open switch 13—1 thereby muting the playback amplifier 18 even though either switch 10—1 or 11—1 is open. When the operator is actuating forward pushbutton 135 or reverse pushbutton 136 of the program locator, the muting is removed by one or the other of the relays 10, 11 being de-energized by the tape break switches 92 or 101. This opens either switch 10—1 or 11—1 as has been explained.

Locating a particular program on the tape is done by means of the forward and rewind program locator buttons 135, 136. These buttons directly energize whichever clutch 39, 41 is chosen to drive the tape forward or rewind at a reasonably high rate of speed. This is effected by the chosen switch shunting out the 15,000 ohm resistor 126 or 127 to the selected clutch, thereby strongly energizing that clutch. Actuating of the program locator buttons also removes the muting from the playback amplifier 18 so that the operator can hear the program being reproduced from the portion of the record material going through the playback head. This permits the operator to adjust the position of the tape accurately for radio broadcasting programs and the like.

LIMIT SWITCHES

A forward limit switch 140 and a reverse limit switch are provided. These are associated with a timing device (not shown) having a forward direction limit hand and a reverse direction limit hand whose positions are manually adjustable. A timer is provided having a hand or pointer which is geared to the tape drive mechanism. The pointer rotates in a clockwise direction as the tape moves forward, and when the pointer engages the forward direction limit hand the forward limit switch 140 is closed energizing relay 4 to stop the tape, as has previously been more fully described in connection with stopping the tape by pushing the stop button 21.

When the tape is moving in the reverse direction the pointer moves in a counter-clockwise direction until it engages the adjustable reverse direction limit hand. This closes the rewind limit switch 141 energizing relay 5 which holds itself in by contact 5—3. Relay 5 throws the contact 5—1 thereby substantially de-energizing the supply reel clutch 41.

PROTECTIVE CIRCUITS

A 15,000 ohm resistor 126, 127 is connected in series with each reel clutch to excite each reel clutch slightly thereby to cause a slight tension to be exerted on the tape at all times to prevent forming of loops. The forward and rewind program locator buttons 135, 136 short-out the 15,000 ohm resistors when in operation. A circuit is made by relay 3A through relay contact 3A—1 to prevent the premature operation of clutch 39 through contact 15—1 at the start when the rewind limit switch has operated.

A 25 ohm resistor 137 is placed in series with the capstan drive motor 44 to reduce its speed when running in the "play" position to aid in the reduction of mechanical noise. This resistor is controlled by the contact 78 of the capstan idler motor assembly. In case of a tape break between the supply reel 25 and the capstan 33 in the "play" position, relay 3 is immediately de-energized, running the capstan idler assembly back to its restricted position. If in the "play" position the tape should break between the capstan 33 and takeup reel 26, the machine will continue to operate normally with the exception that the tape being pulled through the capstan will run on the floor rather than coil up on the takeup reel. Due to the operation of the lower tape break switch 92 the strong energization of the clutch 39 is removed leaving only the slight tensioning energization. This causes the takeup reel 26 to rotate slowly.

In case of a tape break in the fast forward operation the upper tape break switch 101 will open, de-energize relay 1, which opens contact 1—1 to de-energize the takeup clutch 39 and the system will coast to a stop. In the fast rewind operation breakage of the tape will cause the upper tape break switch 102 to de-energize relay 2 which opens contact 2—1 to de-energize the supply reel clutch 41 permitting the system to coast to a stop.

While there have been described what are at present considered to be the preferred embodiments of this invention, it will be obvious to those skilled in the art that various changes and modifications may be made therein without departing from the invention, and it is, therefore, aimed in the appended claims to cover all such cahnges and modifications as fall within the true spirit and scope of the invention.

What is claimed is:

1. In a device for moving filamentary record material: a supply reel, a takeup reel spaced away from said supply reel with a length of said record material extending between said supply reel and said takeup reel; motor drive means including only a single motor, first electrically energizable passive torque transmitting means connected between said motor drive means and said supply reel for selectively coupling said supply reel to said motor drive means, first electric control means connected to said first torque transmitting means and actuable by an operator for energizing said first torque transmitting means with a fixed amount of electric current which is invariable throughout the time of said control action controlling the amount of torque transmitted by said first passive torque transmitting means from said motor drive means to said supply reel, second electrically energizable passive torque transmitting means connected between said motor drive means and said takeup reel for selectively coupling said takeup reel to said motor drive means, second electric control means connected to said second torque transmitting means and actuable by said operator for energizing said second torque transmitting means with a fixed amount of electric current which is invariable throughout the time of said controlled action controlling the amount of torque transmitted by said second passive torque transmitting means from said motor drive means to said takeup reel.

2. A device for moving filamentary record material as set forth in claim 1, further characterized by second unidirectional motor drive means including a unidirectionaly driven capstan, and movable coupling means for selectively coupling said capstan to said record material at a location between said two reels.

3. A device for moving filamentary record material as set forth in claim 2, further characterized by said first and second control means controlling the said coupling means to cause said capstan to be coupled to said record material during forward motion of said record material at a given speed, and to cause said capstan to be decoupled from said record material during forward and rewind motion of said record material at a speed substantially greater than said given speed.

4. A device for moving filamentary record material as set forth in claim 3, further characterized by record material positioning means actuable by said control means, said positioning means holding said record material against said transducer head means during forward motion at said given speed and being spaced away from said record material during forward and rewind motion of said record material at said substantially greater speed.

5. A device for moving filamentary material as set forth in claim 4, further characterized by said filamentary material comprising a magnetizable record track and by magnetic transducer head means being located along the path of motion of said record material at a point between the said supply reel and the said capstan.

6. In a device for moving filamentary material: a supply reel, a takeup reel spaced away from said supply reel, a length of filamentary material extending between said supply reel and said takeup reel, drive means including a motor-driven capstan and a coupling roller for coupling said filamentary material to said capstan for driving said filamentary material in a forward direction; electrically driven means connected to said coupling roller for moving said coupling roller into engagement with said filamentary material and for pressing said filamentary material against said capstan; an idler roller located along the path of motion of said filamentary material between said supply reel and said capstan and driven by said filamentary material, switch means connected in the circuit of said electrically driven means; friction means frictionally biased by said idler roller only during rotation of said idler roller and in contact with said switch means for applying a frictional bias to hold said switch means in a given position to cause said coupling means to couple said filamentary material to said capstan only during rotation of said idler roller.

7. A device for moving filamentary material as set forth in claim 6 further characterized by said coupling roller including a motor and by said switch means in a position other than said given position energizing said motor to cause said coupling roller to move away from said filamentary material to decouple said filamentary material from said capstan.

8. In a device for moving filamentary material: a supply reel, a takeup reel spaced away from said supply reel, means including an electrically controlled passive torque transmitting element for driving said takeup reel, a length of filamentary material extending between said supply reel and said takeup reel, drive means including a motor driven capstan and coupling means for coupling said filamentary material to said capstan for driving said filamentary material; an idler roller located along the path of motion of said material between said capstan and said takeup reel and driven by said material, switch means electrically connected in the electric circuit to said electrically controlled passive torque transmitting element, and friction means frictionally biased by said idler roller and in contact with said switch means for applying a frictional bias to hold said switch means in a given position as said material drives said idler, said switch means in a position other than said given position controlling said torque transmitting element to substantially reduce the torque transmitted from said drive means to said takeup reel.

9. In a magnetic recording and reproducing device: a supply reel, a takeup reel spaced away from said supply reel, a length of magnetic record material extending between said supply reel and said takeup reel, means for driving said record material in forward or reverse directions; first operator actuated control means for controlling the means for driving said record material forward, second operator actuated control means for controlling the means for driving said record material in reverse, and selection means interconnecting said first and second control means, said selection means including a switch in the second control means and means in said first control means for opening said switch when said record member is moving forward so that upon an operator substantially simultaneously actuating both of said control means only one of said control means becomes effective whereby substantial driving forces in only one direction are imparted to said record material.

HENRY JAMES HARSANT.
THEODORE FRANK DEUCHER.

References Cited in the file of this patent

UNITED STATES PATENTS

| Number | Name | Date |
|---|---|---|
| 2,051,787 | Foster | Aug. 18, 1936 |
| 2,106,730 | Foster | Feb. 1, 1938 |
| 2,314,834 | Kiel | Mar. 23, 1943 |
| 2,365,691 | Fodor | Dec. 26, 1944 |
| 2,408,320 | Kuhlik | Sept. 24, 1946 |
| 2,418,541 | Camras | Apr. 8, 1947 |
| 2,419,476 | Begun | Apr. 22, 1947 |
| 2,464,220 | Duncan | Mar. 15, 1949 |
| 2,467,507 | Stone | Apr. 1, 1949 |
| 2,469,706 | Winther | May 10, 1949 |
| 2,500,903 | Neff | Mar. 14, 1950 |
| 2,501,573 | McLouth | Mar. 21, 1950 |
| 2,535,486 | Dank | Dec. 26, 1950 |
| 2,540,299 | Shoup | Feb. 6, 1951 |

FOREIGN PATENTS

| Number | Country | Date |
|---|---|---|
| 459,035 | Great Britain | Dec. 31, 1936 |